March 16, 1937.  C. E. PHILLMORE ET AL  2,073,803
GOVERNOR FOR MOTION PICTURE CAMERAS
Filed Aug. 26, 1935  2 Sheets-Sheet 1
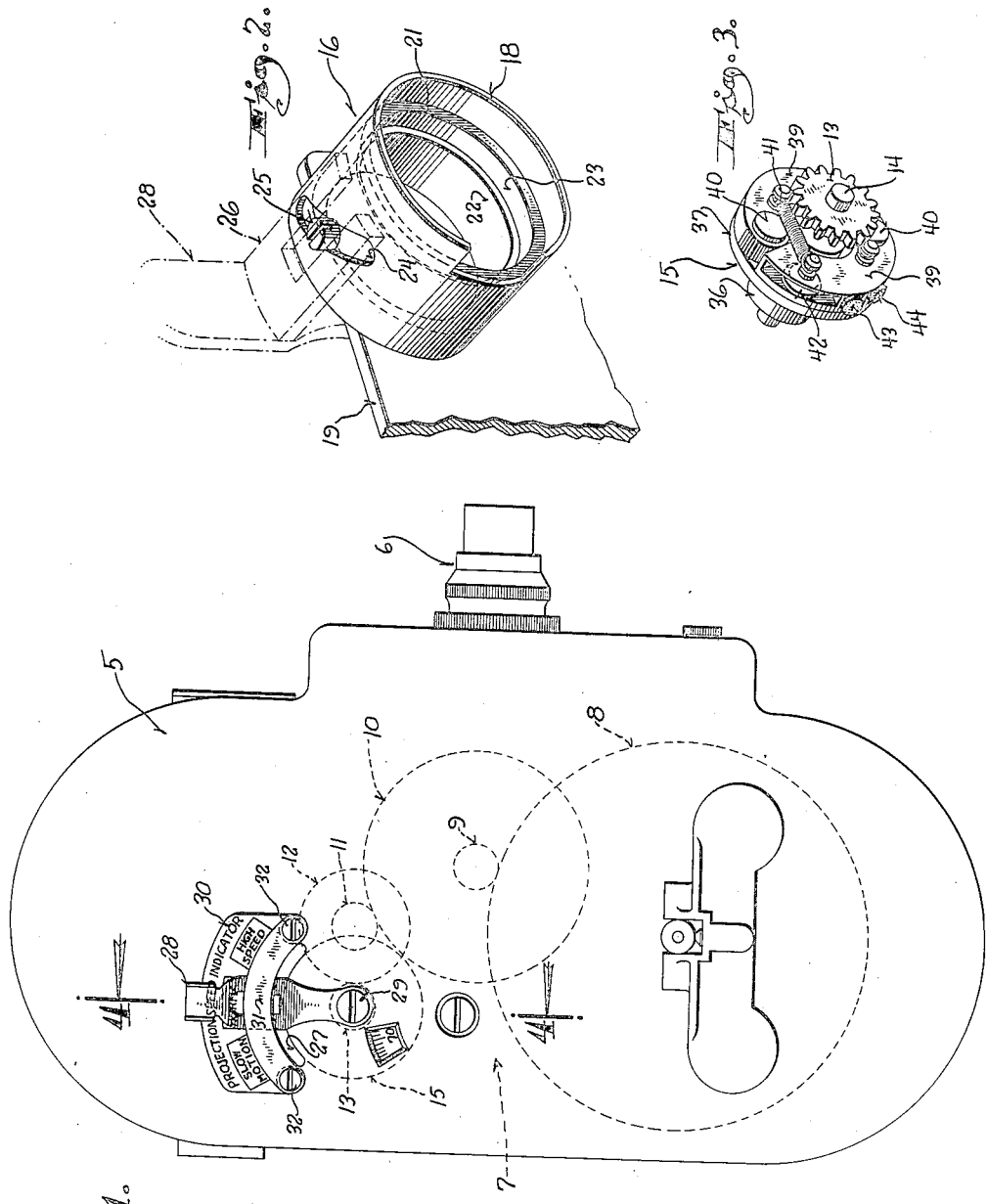
Inventors
Charles E. Phillmore
James H. Tobin

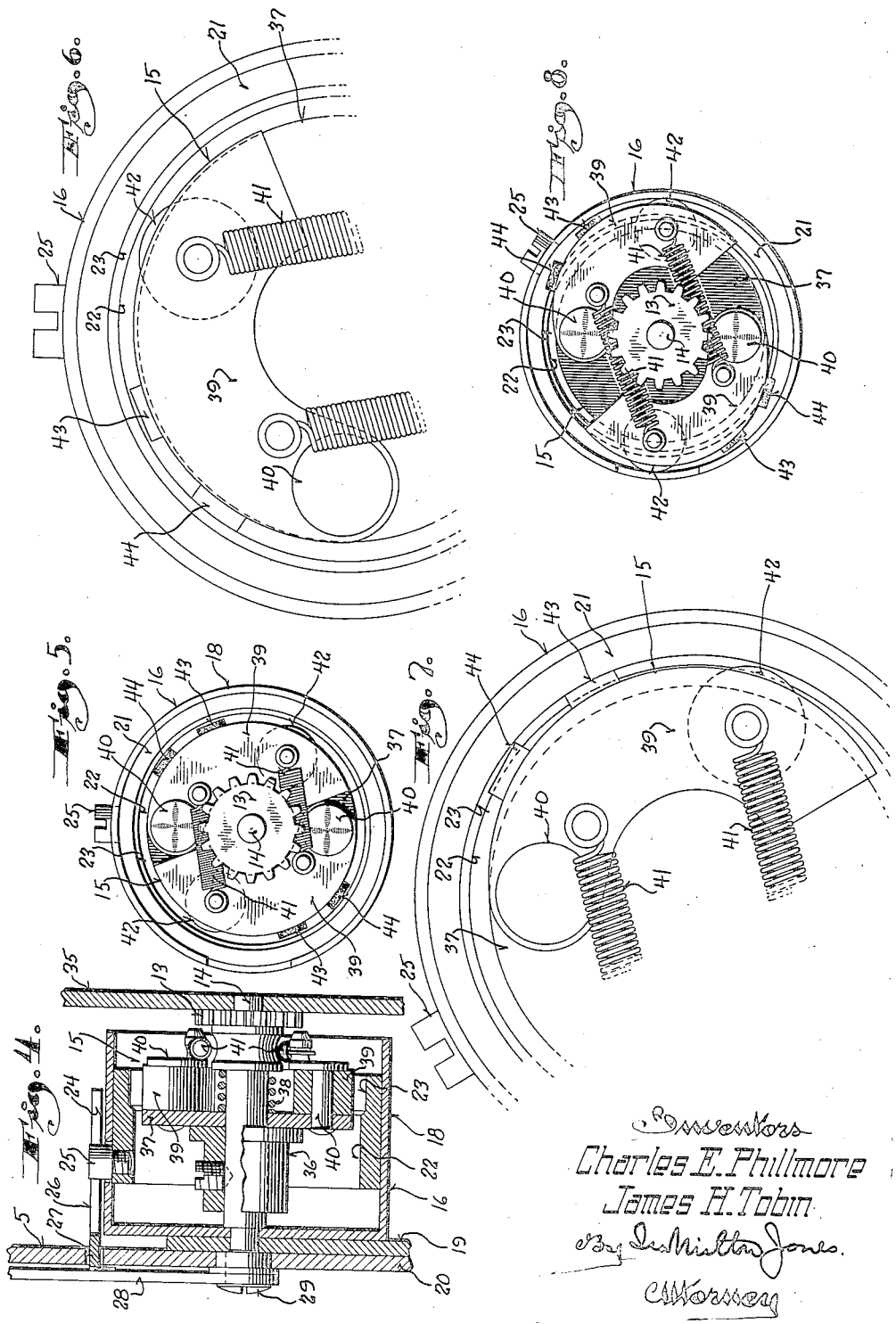

Patented Mar. 16, 1937

2,073,803

UNITED STATES PATENT OFFICE 2,073,803

GOVERNOR FOR MOTION PICTURE CAMERAS

Charles E. Phillmore, Chicago, Ill., and James H. Tobin, Fond du Lac, Wis., assignors to Tobin Tool and Die Company, Inc., Fond du Lac, Wis., a corporation of Wisconsin Application August 26, 1935, Serial No. 37,910

10 Claims. (Cl. 188—184)

This invention relates to improvements in motion picture cameras of the type shown in the co-pending application of Charles E. Phillmore, Serial No. 680,212, filed June 13, 1933.

It is an object of this invention to provide an improved governor particularly adapted for use with motion picture cameras of this type.

Another object of this invention is to provide a simple variable speed governor of general utility but particularly adapted to motion picture cameras.

More specifically it is an object of this invention to provide a governor of the centrifugal brake type which is readily and instantly adjustable from the outside of the camera with which it is used to enable operation of the camera at any one of a number of different speeds.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention constructed according to the best mode so far devised for the practical application of the principles thereof, and in which:

Figure 1 is a side view of a motion picture camera embodying this invention;

Figure 2 is a perspective view of the stationary unit of the governor;

Figure 3 is a perspective view of the revoluble unit of the governor;

Figure 4 is a cross section view through Figure 1 on the plane of the line 4—4;

Figure 5 is a plan view of the assembled governor showing the same in its position of rest;

Figures 6 and 7 are enlarged detail views showing the inertia members of the governor in different active positions; and Figure 8 is a view similar to Figure 5, but showing the inertia members fully projected and in the positions they assume with the governor set to permit maximum speed.

Referring now more particularly to the accompanying drawings, in which like numerals indicate like parts throughout the several views, the numeral 5 designates the outer enclosing casing of a motion picture camera embodying this invention. As is customary in cameras of this type and as brought out in the aforesaid co-pending application, one side wall, specifically the one opposite that shown in Figure 1, provides a removable cover to permit access to the interior of the casing for the application and removal of the film.

At the front of the casing, there is the usual objective 6 past which the film (not shown) is run by the mechanism of the camera. This mechanism forms no part of the present invention and is therefore not shown in detail. Only the gear train connecting the spring motor (not shown) of the mechanism with the governor, indicated generally by the numeral 7, is indicated. The gear train includes a gear 8 driven directly by the spring motor and meshing with a pinion 9 which is fixed with respect to a gear 10. The gear 10 meshes with another pinion 11 fixed with respect to a gear 12 and the gear 12 meshes with a pinion 13 fixed to the shaft or spindle 14 of the revoluble unit 15 of the governor. The revoluble unit of the governor is thus drivingly connected through the gear train described with the spring motor so that the braking effect of the governor is imposed on the spring motor.

The governor, besides the revoluble unit 15, comprises a stationary unit 16. This stationary unit forms in effect a brake drum and consists of a cup 18 having its bottom wall rigidly secured to a base plate 19 disposed within the casing of the camera and upon which the camera mechanism is mounted. It is to be observed that the upper portion of the cup 18 projects above the top edge of the plate 19 and, as shown in Figure 4, that the base plate 19 lies directly beneath the side wall 20 of the casing. Within the cup 18 is a ring 21 having two different inside diameters 22 and 23, the smaller diameter 22 being nearest the bottom of the cup 18. The inside diameters of the ring 21 together with the inside diameter of the cup 18 provide brake surfaces of three different internal diameters with which the inertia members of the revoluble unit cooperate to provide three different governor speeds, as will be hereinafter more fully described.

The revoluble unit 15 is fixed against endwise motion within the cup 18 and its inertia members revolve in a fixed plane normal to the governor axis. Hence, by shifting the ring 21 endwise within the cup 18, it is possible to dispose any one of the three different diameter brake surfaces on said fixed plane to be engaged by the inertia members. To so shift the ring 21 endwise within the cup 18, an inclined cam slot 24 is cut through the wall of the cup and a cam follower in the form of a screw 25 threaded in the ring 21 with its head slidably received in the cam slot coacts with the cam slot upon rotation of the ring to effect the desired endwise shifting thereof.

The head of the screw 25 projects beyond the periphery of the cup 18 and is received between the tines of a bifurcated arm 26 projecting into the interior of the camera casing through an arcuate slot 27 in the wall 20. The arm 26 is fixed to a lever 28 which overlies the outside of the wall 20 and is pivoted thereto as at 29 on the axis of the governor.

As shown in Figure 1, the outer end portion of the lever 28 overlies an indicator plate 30 upon which the three different speeds of the camera mechanism are delineated. An arcuate retainer bar 31 fixed to the wall 20 by screws 32 holds the lever in flat engagement with the indicator plate and also serves to define its limits of swinging movement. Obviously, it is only necessary to move the lever 28 into register with the selected speed indication to set the governor to maintain such speed.

The revoluble unit of the governor is mounted by having one end of its shaft 14 journalled in the bottom of the cup 18 and its other end in a plate 35 which coacts with the base plate 20 in mounting the mechanism of the camera. Fixed to the shaft 14 adjacent the bottom of the cup is a collar 36 against one end of which a disc 37 is pressed by a spring 38 mounted on the shaft between the disc and the hub of the pinion 13. In this manner, the disc 37 is frictionally secured to the shaft to normally turn with the shaft.

Mounted on the disc 37 are the inertia members of the governor which in the present instance comprise two curved arms or levers 39 pivoted to the disc by studs 40. The arms 39 are shaped to embrace the hub of the pinion and the spring 38 and are yieldingly held together by tension springs 41. The engagement of the free end of one arm or lever 39 with the pivoted end of the other arm or lever serves to limit their movement together under the action of the springs 41, and as will be readily apparent, upon rotation of the revoluble unit, the arms 39 are projected outwardly against the tension of the springs 41 by centrifugal force.

The extreme outer end portions of the arms have metal rollers 42 mounted thereon, the peripheries of which extend beyond the outer edges of the arms so as to contact an adjacent brake surface upon outward movement of the arms a sufficient distance. Between the rollers 42 and their pivotal mounting 40, the arms 39 have friction pads 43 and 44 mounted on their outer edges, the pads 44 being nearest the pivotal mounting of the arms and both being preferably formed of leather or some other material having a high coefficient of friction.

As shown in Figure 5, when the governor is at rest and the pivoted arms are in their innermost positions, the friction pads and the rollers 42 are clear of the brake surface lying in the plane of the arms even if it be that provided by the smallest diameter 22 of the ring 21.

With the governor set to maintain the slowest of its three speeds, which speed is used for the taking of high speed action pictures and which is provided by disposing the smallest diameter 22 in operative position, the braking action takes place upon a relatively slight outward projection of the inertia members by reason of the engagement of the tabs 44 with the surface 22. This condition is illustrated in Figure 6.

With the governor set to maintain a medium or normal speed of operation, the larger diameter 23 of the ring is opposite the inertia members and the friction pads 43 act upon outward projection of the governor arms. This condition of the parts is shown in Figure 7.

Slow motion pictures, which require a fast film travel, are provided for by uncovering the largest diameter available which is the inside diameter of the cup 18. In this position of adjustment, the braking action does not commence until the speed of the revoluble unit has reached the point at which the rollers 42 are pressed into contact with the brake surface as shown in Figure 8.

Through the use of metal rollers to take effect at high speed and friction pads of leather or some other material having a high coefficient of friction which act at slower speeds, extreme contrasts of braking or governing efficiency are obtained, and it is to be observed that for each of the three different steps or internal diameters of the shell, a separate friction element is provided. This permits a fine adjustment of the differences in braking efficiency and if desired, the two pads may be formed of materials having different coefficients of friction.

From the foregoing description taken in connection with the accompanying drawings, it will be readily apparent to those skilled in the art, that this invention provides an exceedingly simple variable speed governor for motion picture cameras, and that while the specific embodiment of the invention described herein provides for variation in definite steps, it will be readily apparent that merely by having the internal diameter of the shiftable ring of cone shape, a gradual uniform adjustment may be obtained.

What we claim as our invention is:

1. In a governor, a stationary brake drum, a revoluble unit having inertia means rotatable within the brake drum and projectable outwardly by centrifugal force into contact with the internal diameter of the brake drum, and a ring slidable endwise within the brake drum for changing the internal diameter of the drum so as to enable adjustment of the speed the governor is to maintain.

2. In a governor, a stationary brake drum, a revoluble unit having inertia means rotatable within the brake drum and projectable outwardly by centrifugal force into contact with the brake drum, a ring slidable endwise within the brake drum for changing the internal diameter thereof to thereby enable adjustment of the speed the governor is to maintain, and means operable from the outside of the brake drum for shifting the ring endwise within the drum.

3. In a governor, a stationary brake drum, a revoluble unit including inertia means rotatable within the brake drum and projectable outwardly by centrifugal force into contact with the internal diameter of the brake drum, a ring slidable endwise within the brake drum for changing the internal diameter thereof, and means operable upon relative rotation of the ring and the brake drum for shifting the ring endwise within the brake drum to alter the effective internal diameter of the drum.

4. In a governor, a stationary brake drum, a revoluble unit including inertia means rotatable within the brake drum and projectable outwardly by centrifugal force into contact with the internal diameter of the brake drum, a ring slidable endwise within the brake drum for changing the internal diameter thereof, and a cam follower on the ring received in a cam slot in the drum operable upon relative rotation between the ring and the drum to shift the ring endwise within the drum to change the effective internal diameter of the drum.

5. In a governor, a stationary brake drum, a revoluble unit including inertia means rotatable within the brake drum and projectable outwardly by centrifugal force into contact with the internal diameter of the brake drum, a ring slidable endwise within the brake drum for changing the internal diameter thereof, a cam follower on the ring received in a cam slot in the drum operable upon relative rotation between the ring and the drum to shift the ring endwise within the drum to change the effective internal diameter of the drum, and an adjusting lever mounted to swing about the axis of the brake drum and connected with the cam follower to transmit rotation to the ring.

6. In a motion picture camera, the combination of an enclosing casing having a flat side wall, mechanism within the casing, a variable speed governor to control the speed of operation of the mechanism including a member rotatable on an axis perpendicular to said flat side wall and operable upon rotation thereof to effect adjustment of the governor, an adjusting lever overlying the outside of said flat side wall and pivoted to said side wall to swing on said axis, and a connection between said lever and said rotatable member passing through an arcuate slot in said flat side wall.

7. In a motion picture camera, the combination of an enclosing casing, mechanism within the casing, a variable speed governor to control the speed of operation of the mechanism including a member rotatable about an axis perpendicular to one wall of the casing, means operable upon rotation of said member to effect adjustment of the governor to maintain any one of different selected speeds, a lug projecting radially from said rotatable member, an adjusting lever overlying the outside of said wall of the casing and pivoted thereto to swing on the axis of said rotatable member, and an arm fixed to said lever and entering the interior of the casing through an arcuate slot in said wall and connected to said lug so that swinging movement of the lever imparts rotation to said rotatable member.

8. In a governor, a revoluble unit including inertia means adapted to be projected outwardly by centrifugal force, a stationary shell encircling the revoluble unit to be frictionally engaged by the inertia means, means for adjusting the internal diameter of the shell opposite the inertia means, and a plurality of friction elements carried by the inertia means for engagement with the internal diameter of the shell, only one of said friction elements being engageable with the shell at one time as determined by the internal diameter of the shell opposite the inertia means.

9. In a governor, a revoluble unit including inertia means adapted to be projected outwardly by centrifugal force, a stationary brake shell encircling the revoluble unit, means for adjusting the internal diameter of the brake shell opposite the inertia means, and a plurality of friction elements carried by the inertia means engageable with the brake shell upon outward projection of the inertia means by centrifugal force, only one of said friction means being engageable with the brake shell at one time as determined by the internal diameter of the brake shell, and one of said friction elements having a different coefficient of friction than the others so as to afford a wide range of braking efficiency.

10. In a governor, a brake drum, means for adjusting the effective diameter of the brake drum within limits, a revoluble unit within the brake drum and including a pivoted inertia member adapted to be swung outwardly by centrifugal force, means mounted on the outer end of the pivoted inertia member engageable with the braking surface only when the effective diameter of the drum is large and the inertia member is projected outwardly a maximum distance, and a friction pad carried by the inertia member between its pivotal mounting and said means adapted to engage the braking surface of the drum when its effective diameter is smaller and upon a lesser outward projection of the inertia member.

CHARLES E. PHILLMORE.
JAMES H. TOBIN.